United States Patent Office 3,528,968
Patented Sept. 15, 1970

3,528,968
HETEROCYCLIC SUBSTITUTED IMIDAZOLINE HYDRAZONES
William J. Houlihan and Robert E. Manning, Mountain Lakes, N.J., assignors to Sandoz-Wander, Inc., a corporation of Delaware
No Drawing. Filed Nov. 24, 1967, Ser. No. 685,330
Int. Cl. C07d 49/34
U.S. Cl. 260—240        6 Claims

ABSTRACT OF THE DISCLOSURE

This disclosure pertains to hydrazones containing a heterocyclic moiety, e.g., 2-acetylthiophene-2-imidazlin-2-yl hydrazone. These compounds are useful as hypotensives.

---

This invention relates to novel heterocyclic compounds. In particular, this invention pertains to imidazoline hydrazones substituted within an additional heterocyclic moiety. This invention also relates to processes for preparing the novel compounds.

The hydrazones of this invention may be represented by the following structural formula:

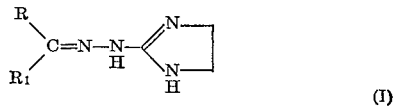

(I)

where

R represents thienyl, pyrryl, or pyridyl, and
$R_1$ represents H or loweralkyl.

The heterocyclic groups defined by R above may be attached to the remainder of compound (I) at the 2, 3 and, in the case of pyridine, the 4-positions. The term "loweralkyl" as used herein is intended to represent those alkyl groups having 1.5 carbon atoms, e.g., methyl, ethyl, isopropyl, butyl and the like.

The compounds of Formula I may be prepared by reacting a compound of the formula

(II)

with a hydrazinoimidazoline of the formula

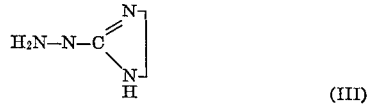

(III)

or an acid addition salt thereof, where R and $R_1$ are as previously defined.

In accordance with the above process, the compounds of Formula I are prepared by treating the compounds of Formula II with the free base or acid salt of the compounds of Formula III in solvent such as alcohols, e.g., lower alkanols such as ethanol, isopropanol and the like. The reaction may be carried out at a temperature of from about 75°–150° C., preferably the reflux temperature of the reaction mixture, for about 8–48 hours. The particular solvent and temperatures used are not critical to the successful completion of the reaction. The acid addition salts of compounds (III) which may be used include the strong mineral acid addition salts, e.g., the hydrogen halides such as the hydrogen chloride, hydrogen iodide or hydrogen bromide, and the like. The resulting product is readily recovered by conventional techniques, e.g., filtration. When the product is recovered as an acid addition salt, it may be converted to the free base by standard techniques. The compound of Formula III and various of the compounds of Formula II are known and may be prepared according to methods disclosed in the literature. Those compounds of Formula II not specifically disclosed may be prepared from known materials using analogous methods.

The compounds represented by Formula I above are useful because they possess pharmaceutical properties in animals. In particular, these compounds are useful as hypotensives, as indicated by their activity in anesthetized cat tested by blood pressure measurement using a mercury manometer or transducer via a catheter inserted in the carotid or femoral artery. When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, these compounds (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonnate, benzene-sulfonate and the like. In general, satisfactory results are obtained when these compounds are administered at a daily dosage of about 0.1 milligram to about 20 milligrams per kilogram of animal body weight. This daily dosage is preferably administered 2 to 4 times a day, or in sustained release form. For most large mammals such as primates, the total daily dosage is from about 10 milligrams to about 450 milligrams. Dosage forms suitable for internal use comprise from about 2.5 milligrams to about 225 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by weight |
|---|---|
| 2 - pyrrolecarboxaldehyde - 2 - imidazolin-2-yl hydrazone hydrogen iodide | 30 |
| Tragacanth | 2 |
| Lactose | 59.5 |
| Corn starch | 5 |
| Talcum | 3 |
| Magnesium stearate | 0.5 |

The following examples are provided for tne purpose of illustration and not by way of limitation. They are not intended so as to limit the scope of the invention as defined in the appended claims.

EXAMPLE 1

2-acetylthiophene-2-imidazolin-2-yl hydrazone hydrogen iodide

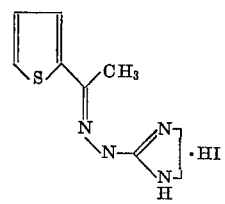

A mixture of 3.5 g. (0.025 mole) of 2-acetylthiophene, 4.6 g. (0.02 mole) of 2-hydrazinoimidazoline hydrogen iodide and 75 ml. of ethanol is stirred at room temperature for 18 hours. The solid is filtered off and then crystallized from isopropanol to provide 2-acetylthiophene-2-imidazolin-2-yl hydrazone hydrogen iodide; M.P. 250–252° C.

EXAMPLE 2

2-pyrrolecarboxaldehyde-2-imidazolin-2-yl hydrogen iodide

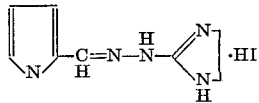

A mixture of 3.13 g. (0.033 mole) of 2-pyrrolecarboxaldehyde, 6.85 g. (0.03 mole) of 2-hydrazinoimidazoline hydrogen iodide and 100 ml. of ethanol is stirred at room temperature for 18 hours. The solid is filtered off and then crystallized from isopropanol to provide 2-pyrrolecarboxaldehyde-2-imidazolin-2-yl hydrazone hydrogen iodide; M.P. 215–217° C.

EXAMPLE 3

2-pyridinecarboxaldehyde-2-imidazolin-2-yl hydrazone hydrogen iodide

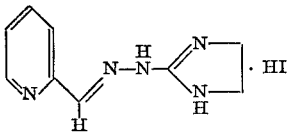

A mixture of 3.5 g. (0.033 mole) of 2-pyridinecarboxaldehyde, 6.85 g. (0.03 mole) of 2-hydrazinoimidazoline hydrogen iodide and 100 ml. of ethanol is stirred at room temperature for 18 hours. The solid is filter off and then crystallized from isopropanol to provide 2-pyridinecarboxaldehyde-2-imidazolin-2-yl hydrazone hydrogen iodide; M.P. 208°–210° C.

EXAMPLE 4

2-thiophenecarboxaldehyde-2-imidazolin-2-yl hydrazone hydrogen iodide

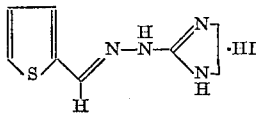

A mixture of 3.36 g. (0.03 mole) of 2-thiophenecarboxaldehyde, 6.85 g. (0.03 mole) of 2-hydrazinoimidazoline hydrogen iodide and 100 ml. of ethanol is stirred at room temperature for 18 hours. The solid is filtered off and then crystallized from isopropanol to provide 2-thiophenecarboxaldehyde-2-imidazolin-2-yl hydrazone hydrogen iodide; M.P. 218°–220° C.

EXAMPLE 5

3-pyridinecarboxaldehyde-2-imidazolin-2-yl hydrazone hydrogen iodide

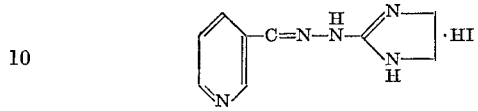

A mixture of 3.2 (0.03 mole) of 3-pyridinecarboxaldehyde, 6.85 g. (0.03 mole) of 2-hydrazinoimidazoline hydrogen iodide and 100 ml. of ethanol is stirred at room temperature for 18 hours. The solid is filtered off and then crystallized from isopropanol to provide 3-pyridinecarboxaldehyde-2-imidazolin-2-yl hydrazone hydrogen iodide; M.P. 247–249° C.

What is claimed is:
1. A compound of the formula

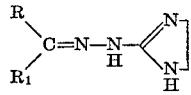

and pharmaceutically acceptable acid addition salts thereof, where
R represents thienyl, pyrryl, or pyridyl, and
$R_1$ represents H or loweralkyl.
2. The compound of claim 1 which is 2-acetylthiophene-2-imidazolin-2-yl hydrazone.
3. The compound of claim 1 which is 2-pyrrolecarboxaldehyde-2-imidazolin-2-yl hydrazone.
4. The compound of claim 1 which is 2-pyridinecarboxaldenyde-2-imidazolin-2-yl hydrazone.
5. The compound of claim 1 which is 2-thiophenecarboxaldehyde-2-imidazolin-2-yl hydrazone.
6. The compound of claim 1 which is 3-pyridinecarboxaldehyde-2-imidazolin-2-yl hydrazone.

References Cited
FOREIGN PATENTS
768,089  2/1957  England.

JOHN D. RANDOLPH, Primary Examiner

U.S. Cl. X.R.

260—309.6, 296; 424—263, 273